United States Patent [19]

Van der Piepen

[11] Patent Number: 5,415,764
[45] Date of Patent: May 16, 1995

[54] PROCESS FOR THE FURTHER PROCESSING OF A VACUUM RESIDUE IN A CRUDE OIL REFINERY

[75] Inventor: Rolf Van der Piepen, Butzbach, Germany

[73] Assignee: Buss AG, Basel, Switzerland

[21] Appl. No.: 152,703

[22] Filed: Nov. 16, 1993

[30] Foreign Application Priority Data

Nov. 30, 1992 [CH] Switzerland ............... 3681/92

[51] Int. Cl.$^6$ ............................................. C10G 7/00
[52] U.S. Cl. ................................. 208/361; 208/354; 208/368
[58] Field of Search .............. 208/352, 354, 355, 357, 208/358, 361, 364, 366, 368, 369, 92, 94, 102, 103, 104, 105; 203/88

[56] References Cited

U.S. PATENT DOCUMENTS 4,124,496  7/1978  Cummings ..................... 208/361
4,415,443  11/1983  Murphy ......................... 208/355

FOREIGN PATENT DOCUMENTS

3122650A1  12/1982  Germany .

Primary Examiner—Asok Pal
Assistant Examiner—Bekir L. Yildirim
Attorney, Agent, or Firm—Oblon, Spivak, McClelland, Maier & Neustadt

[57] ABSTRACT

A process for further processing a residue remaining after vacuum distillation in a crude oil refinery, which entails subjecting the residue remaining after vacuum distillation to flash distillation, thereby producing a distillate and a residue.

10 Claims, 2 Drawing Sheets

PROCESS FOR THE FURTHER PROCESSING OF A VACUUM RESIDUE IN A CRUDE OIL REFINERY

BACKGROUND OF THE INVENTION

1. Field of the Invention

The present invention relates to a process for the further processing of a residue remaining after vacuum distillation in a crude oil refinery and an apparatus therefor.

2. Description of the Background

Crude oil is conventionally processed in a refinery in a plurality of distillation stages. The first distillation stage proceeds at atmospheric pressure, and is followed by vacuum distillation at a pressure of about 10 to 30 mbar, which affords distillates having an atmospheric boiling point of up to about 570° C. The low-value residue remaining after the vacuum distillation has a boiling point in excess of 570° C. and contains, depending on the quality of the crude oil to be processed, a considerable proportion of the original crude oil feed. In recent years, an increase has been observed in the number of crude oils which yield an appreciable amount of vacuum residue. Therefore, further processing of this residue has become increasingly important.

The further processing of the vacuum residue is, at present, carried out either by solvent extraction or by cracking. Both processes are complex, however, and produce, in addition to the desired products, an economically worthless fraction of tar and coke. Both tar and coke are very inexpensive materials, and the amount thereof produced should be maintained as low as possible.

Swiss Patent 666 901 discloses a process in which the vacuum residue is further processed by being subjected to thin-layer short-path distillation. This process affords a comparatively large yield of valuable products, but is technically complex and costly. In addition, the use of complex additional equipment is required. Since the residue to be further processed has a very high temperature after vacuum distillation, it must be cooled prior to thin-film short-path distillation; i.e., its heat content cannot be usefully utilized in full.

Thus, a need exists for a process which is less complex in terms of equipment required, and which, at the same time, offers an increased yield of heavy vacuum gas oil and a reduced amount of tar-like residue remaining.

SUMMARY OF THE INVENTION

Accordingly, it is an object of the present invention to provide a more economical process which is, in particular, less complex in terms of equipment used for further processing of a residue from the vacuum stage of petroleum refineries. It is also an object of the present invention to provide a process which affords an increase in the yield of heavy vacuum gas oil, thereby reducing the amount of tar-like residue remaining to a minimum.

The above objects and others are provided by a process for further processing a residue remaining after vacuum distillation in a crude oil refinery, which entails subjecting the residue remaining after vacuum distillation to flash distillation, thereby producing a distillate and a residue.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
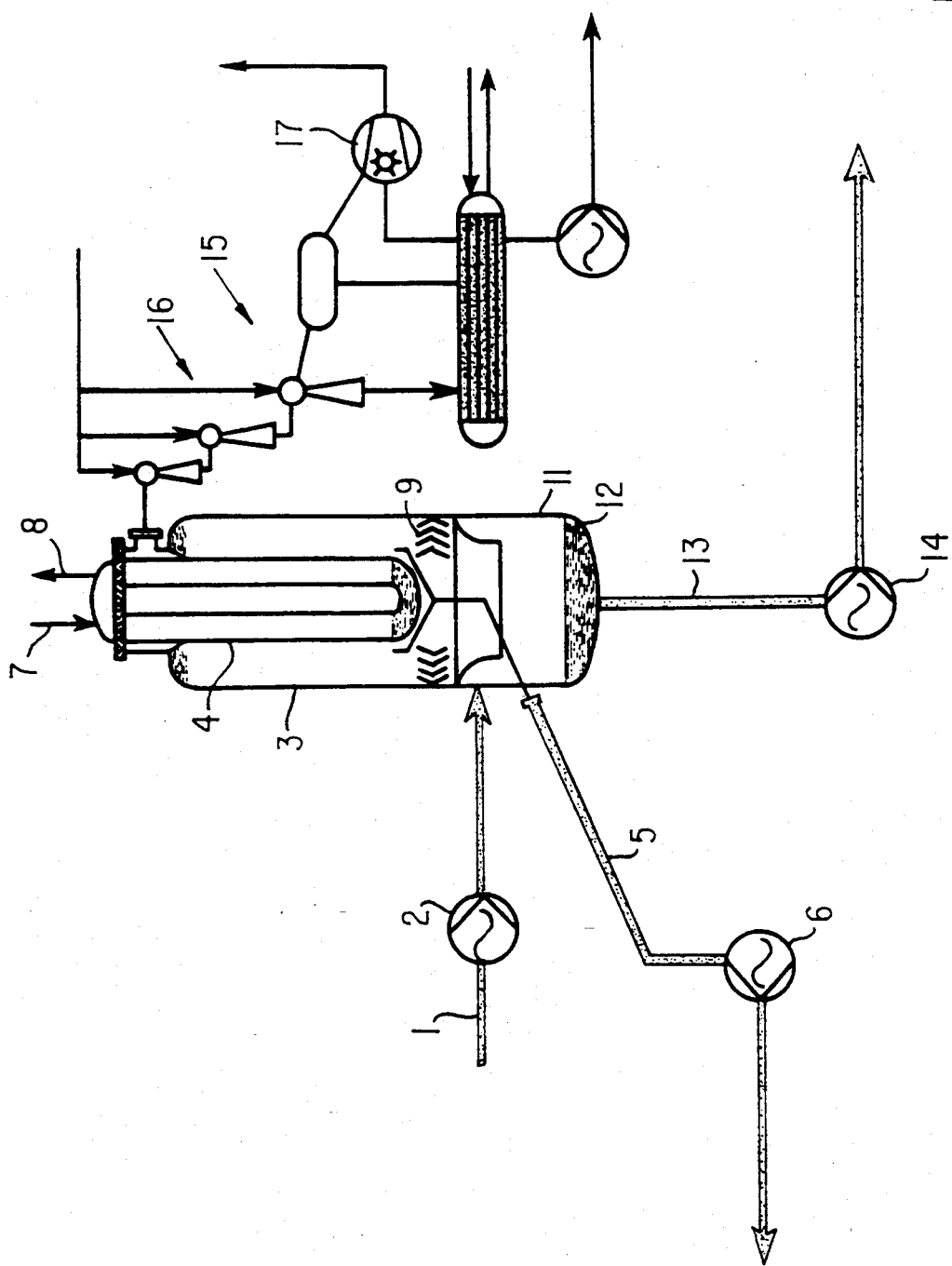
FIG. 1 illustrates a flow diagram of an embodiment of the process of the present invention.

Flash distillation is also technically known as decompression distillation. In this process, the feed is vaporized by decompression, i.e., pressure reduction. In accordance with the present invention, a large part of the heat content of the vacuum residue is utilized, so that the latter may be fed directly, without cooling, to the flash distillation.

The flash distillation of the present invention is generally effected at pressures lower than in the preceding vacuum distillation, but these, at less than 5 mbar, preferably from 0.3 to 1 mbar, are still achievable with relatively simple and economical vacuum equipment, for example with a multi-stage steam-jet vacuum plant. At the same time, there is no longer a need for the pre-degassing stage required for thin-film short-path distillation or for the use of rotating thin-film evaporators.

A further substantial, and surprising, advantage of the present invention is that the distillate obtained is largely free of heavy metals, in particular, if by pre-expansion of the feed through droplet precipitators and/or diversion of the feed in the flash chamber mist formation is prevented or the drops formed are collected before condensation of the vapors. The minimization of the heavy-metal content is important in the context of cracking of the distillate, in which the sensitive catalysts are poisoned by heavy metals.

The invention is further illustrated by reference to FIGS. 1-3, which will now be described in more detail. The elements depicted in these Figures are defined hereinbelow by number.

1 vacuum residue
2 feed pump
3 flash box
4 condenser
5 line
6 distillate pump
7 flow direction
8 flow direction
9 droplet precipitator
11 lower part of 3
12 residue
13 line
14 residue pump
15 vacuum plant
16 steam jet vacuum pump
17 water ring pump
21 flash box
22 outer wall of 21

23 droplet precipitator
24 lamellar plates
25 condenser
31 flash box
32 outer wall of 31
33 droplet precipitator
34 lamellar plates
35 condenser
36 feed channel
37 feed
38 guide plate
39 guide grid As is shown in FIG. 1, in carrying out the process of the present invention, the vacuum residue 1 from the preceding vacuum distillation (not shown) is fed by means of a feed pump 2 to a flash box 3. Since the pressure in the flash box is lower than that in the preceding vacuum column (not shown), the lower-boiling fractions in the feed vaporize on entering the flash box as a result of the decompression. In the flash box, the pressure is preferably less than 5 mbar, preferably from 0.3 to 1 mbar. The vapors are condensed by means of a condenser 4 arranged within the flash box 3 and conducted away via a line 5 by means of a distillate pump 6. The condenser is cooled, for example, by means of warm water, the flow direction of which is indicated by the arrows 7, 8. Upstream of the condenser 4 there are arranged horizontal droplet precipitators 9 which collect the droplets before they reach the condenser 4 and which also conduct them to the lower part 11 of the flash box 3. In this lower part 11 the residue 12 is also collected and separately from the distillate is fed via the line 13 by means of a residue pump 14 to further processing. The flash distillation shown can be provided downstream with a second flash distillation with prior preheating.

The vacuum in the flash box 3 is produced by means of a vacuum plant 15 which has a three-stage steam-jet vacuum pump 16 having a downstream water ring pump 17.

Figure 2:
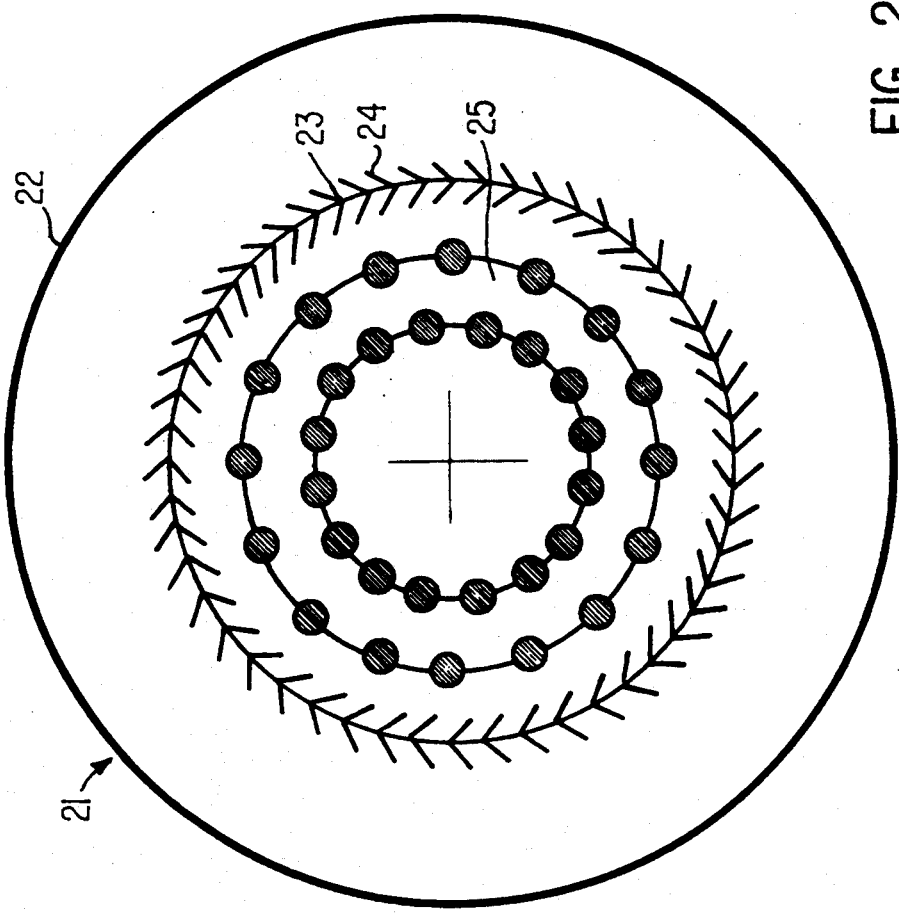
FIG. 2 illustrates a horizontal section through a flash chamber or flash box for carrying out the process of the invention.

A flash box 21 is shown separately in horizontal section in FIG. 2. Within the outer wall 22 of the flash box 21 there are arranged concentrically from outside to inside a droplet precipitator 23 having vertical lamellar plates 24 and a condenser 25 operated with warm water.

Figure 3:
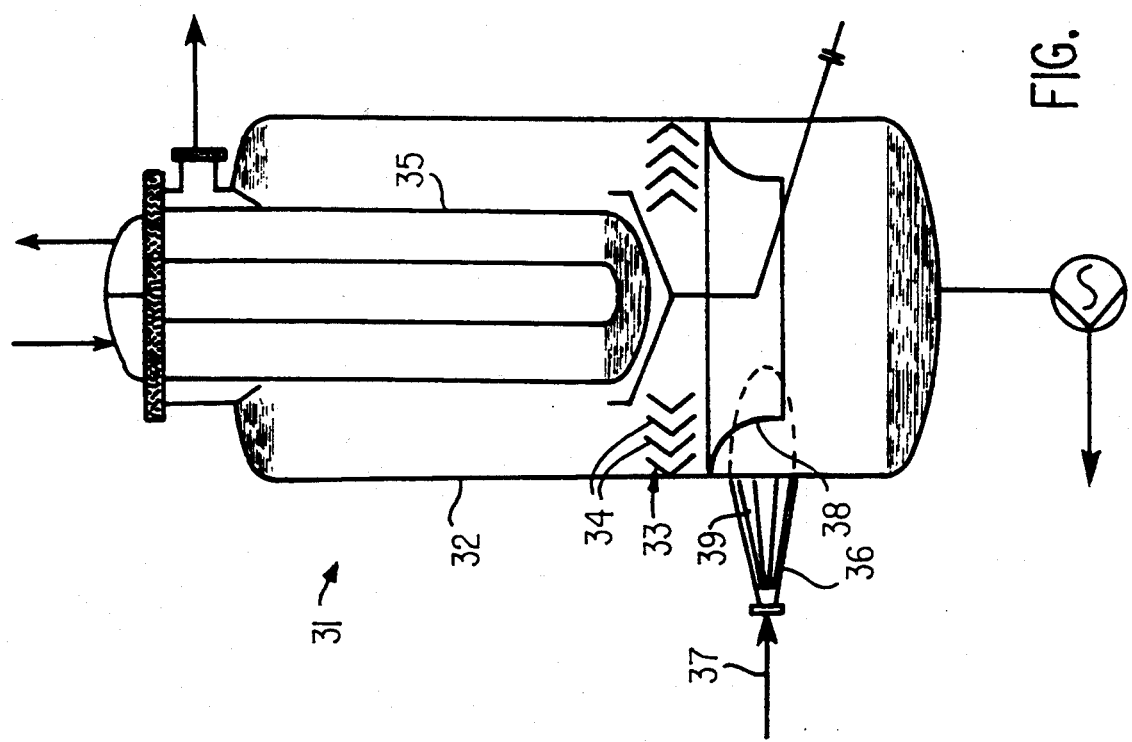
FIG. 3 illustrates an axial section through a flash chamber or flash box for carrying out the process of the invention.

FIG. 3 shows a further flash box 31 in axial section which inside its outer wall 32 contains a droplet precipitator 33 having horizontal lamellar plates 34, and a condenser 35. A feed channel 36 leads tangentially into the flash box 31. The cross-section of this channel widens as it joins the flash box 31 by a factor of preferably from 50 to 100. In the feed channel 36 a guide grid 39 is arranged to ensure a uniform distribution of a feed 37. The feed 37 entering the flash box 31 via the feed channel 36 is first diverted by a guide plate 38. The removal of the distillate and the residue is carried out as shown separately in FIG. 1.

The proportion of heavy vacuum gas oil obtainable by the process of the invention is, depending on the operating mode of the upstream vacuum column and on the pressure in the flash box, from about 10 to 30% of the amount of feed to the flash distillation. The distillate is of high quality and in particular contains only small amounts of undesired asphaltenes and heavy metals.

The amount of distillate can be increased by addition of a heat transfer oil-operated preheating stage in which the feed to the flash box is heated by from about 10° to 20° C. As a result of the short residence time of the vacuum residue at a high temperature no cracking is observed.

During the vaporization resulting from the expansion in the flash box, the temperature drops, so that downstream of the process of the invention there can be arranged a thin-film/short-path distillation, without great need for cooling.

In order to further illustrate the present invention, reference is made hereinbelow to certain examples which are provided solely for purposes of illustration and are not intended to be limitative.

The process of the invention may be illustrated by two examples, which were carried out with two different grades of petroleum, i.e., Arabian Light and Venezuela. The table below gives the operating conditions in the vacuum distillation, the residue of which is further processed in accordance with the invention, and also its heavy metal content. These are followed by the operating conditions of the process of the invention and the details, including quantity, of the distillate.

| Sample | Arabian Light oil | Venezuela oil |
|---|---|---|
| operating pressure of the vacuum column | 15 mbar | 20 mbar |
| bottom temperature of the column | 390° C. | 360° C. |
| corresponding temperature of the oil at atmospheric pressure | 570° C. | 526° C. |
| heavy-metal content of the column residue (Ni + V) | 99 ppm | 682 ppm |
| operating temperature flash box | 0.50 mbar | 0.50 mbar |
| vapor temperature flash box | 367° C. | 340° C. |
| corresponding temperature of the oil at atmospheric pressure | 616° C. | 592° C. |
| distillate quantity from flashing | 31 vol. %*) | 27 vol. % |
| heavy-metal content of the distillate (Ni + V) | 5 ppm | 12 ppm |

From the above results, it may be readily seen that the metal content of the distillate is greatly reduced by the present process.

Having described the present invention, it will be apparent to one of ordinary skill in the art that numerous modifications and variations of the present invention may be effected without departing from the spirit and scope thereof. It is, therefore, to be understood that within the scope of the appended claims, the invention may be practiced otherwise than as specifically described herein.

What is claimed as new and is desired to be secured by Letters Patent of the United States is:

1. A process for further processing a residue remaining after vacuum distillation, in a crude oil refinery, which comprises subjecting the residue remaining after vacuum distillation to flash distillation in a chamber, thereby producing a distillate and a residue, condensing the distillate inside the flash chamber, whereby the distillate and the residue are obtained separately.

2. The process according claim 1, wherein the flash distillation is carried out at a system pressure of less than 5 mbar.

3. The process according to claim 2, wherein said system pressure is from 0.3 to 1 mbar.

4. The process according to claim 1, wherein the residue from vacuum distillation is preheated prior to the flash distillation.

5. The process according to claim 1, wherein the residue obtained after a first flash distillation is heated and subjected to a second flash distillation.

6. The process according to claim 1, wherein the residue of vacuum distillation is allowed to expand during feeding, to the flash chamber.

7. The process according to claim 1, wherein the residue of vacuum distillation is allowed to expand upstream of the flash chamber.

8. The process according to claim 1, wherein the feed stream during flashing is conducted in a designated direction.

9. The process according to claim 8, wherein the feed stream during flashing is conducted away from the condenser.

10. The process according to claim 1, wherein droplets formed during flashing are collected prior to condensation.

* * * * *